United States Patent [19]

Périard et al.

[11] Patent Number: 4,810,600

[45] Date of Patent: Mar. 7, 1989

[54] CATHODE COATING DISPERSION FOR BATTERIES

[75] Inventors: Jacques Périard; Mathis Wissler, both of Aargau, Switzerland

[73] Assignee: Lonza Ltd., Gampel/Valais, Switzerland

[21] Appl. No.: 143,743

[22] Filed: Jan. 14, 1988

[30] Foreign Application Priority Data

Jan. 15, 1987 [CH] Switzerland .......................... 125/87

[51] Int. Cl.$^4$ ......................... H01M 4/50; H01B 1/06
[52] U.S. Cl. ................................... 429/224; 429/218; 429/212; 429/232; 252/511; 252/510; 252/182.1
[58] Field of Search ............... 429/218, 232, 212, 224, 429/251, 254; 252/511, 182.1; 524/495, 496

[56] References Cited

U.S. PATENT DOCUMENTS

| | | | |
|---|---|---|---|
| 3,698,953 | 10/1972 | Eisenberg | 429/232 |
| 4,297,231 | 10/1981 | Kahara et al. | 429/232 |
| 4,351,815 | 9/1982 | Glasstetter et al. | 429/232 |
| 4,656,105 | 4/1987 | Kobayashi et al. | 429/232 |
| 4,687,598 | 8/1987 | Varma | 252/511 |
| 4,702,860 | 10/1987 | Kinderor et al. | 252/511 |

*Primary Examiner*—Josephine Barr
*Attorney, Agent, or Firm*—Fisher, Christen & Sabol

[57] ABSTRACT

A cathode coating dispersion containing graphite and/or carbon black, which is suitable for battery production, especially for a water-resistant and alkali-resistant and yet electrically conductive coating of the cathode surfaces. The protective film is applied as a homogeneous aqueous dispersion and contains a binder which is a copolymer of (a) vinyl acetate and ethylene, (b) vinyl acetate and vinyl chloride, (c) styrene and butadiene or (d) vinyl acetate, vinyl chloride and ethylene.

16 Claims, No Drawings

CATHODE COATING DISPERSION FOR BATTERIES

BACKGROUND OF THE INVENTION

1. Field Of The Invention

This invention relates to a graphite-containing cathode coating dispersion for batteries with improved storage and discharge properties, which is applied to the cathode holder and forms an electrically conductive protective film. 2. Background Art From Japanese Published Patent Document No.58-48361 (Japanese Patent) Application No. 56-145503 alkali dry cells are known which exhibit improved self-discharge properties. The improvement is attained by an electrically conductive protective film made of polyvinyl isobutyl ether and a carbon-containing material, applied to the inside of the cathode container. The materials are applied with the help of an organic solvent, e.g., xylene, and after evaporation of the solvent the electrically conductive film with rubberlike elasticity remains.

Japanese Published Patent Document No. 59-224054 (C.A. 102:175, 011f) also describes an electrically conductive composition of graphite and polyvinylpyrrolidinone on the inner surface of a battery container. Ethanol is proposed as the solvent for the polyvinylpyrrolidinone and as the carrier for dispersing the graphite.

The drawback of these coatings is the necessity of applying an organic solvent as the carrier of the components. But in the manufacturing process, in battery production, solvent vapors are undesirable and can lead to considerable breakdowns by exhaust air filter damage or require a special explosion protection.

The use of known type conductive varnishes do not attain the object either, since the corresponding films are not water-resistant.

The use of latices has further drawbacks, since they are not resistant in the prevailing oxidative conditions and in alkali medium.

BROAD DESCRIPTION OF THE INVENTION

The object of the invention is to provide a dispersion for the coating of cathode supports, which requires no organic solvent and leads to protective films, which are water-resistant and resist oxidative attacks and alkali media.

According to the invention, the object is attained by a cathode coating dispersion containing graphite or carbon black, which is applied as an aqueous dispersion and contains a binder which is a copolymer of (a) vinyl acetate and ethylene, (b) vinyl acetate and vinyl chloride, (c) styrene and butadiene, or (d) vinyl acetate, vinyl chloride and ethylene. The cathode coating dispersion forms an electrically conductive protective film on the cathode holder. The resultant batteries have improved storage and discharge properties.

Suitably the copolymer of styrene and butadiene is carboxylated and thus made cross-linkable by incorporation of unsaturated carboxylic acids, preferably acrylic acid. Especially such styrene-butadiene copolymers are used which exhibit a styrene portion of more than 50 percent, especially preferably between 70 and 80 percent. Similarly, mixtures of the binders among themselves can also be used.

The dispersions according to the invention suitably behave pseudoplastically and thixotropically.

An essential component of the dispersion is water, which functions as the carrier of the solid portions. The water portion of the ready-to-use dispersion is suitably 40 to 95 percent by weight, preferably 50 to 80 percent by weight.

Graphite or carbon black, such as acetylene black, or mixtures of the materials, is used as the electrically conductive material.

Suitable graphites are the natural or synthetic graphites of high purity and high crystallinity. The ash content should be below 0.1 percent. Especially suitable are graphites which additionally exhibit a grain size of less than 6 microns and a BET surface of 12 $m^2/g$ or more.

The electrically conductive material is used in an amount of 40 to 85 percent by weight, relative to the dry mass of the dispersion (conductive material, surfactants, additives and polymer). Preferably the portion amounts to 55 to 75 percent by weight. The ratio of conductive material to binder is also essential, since the aim is a high conductivity and the latter depends upon a large amount of the conductive material.

For the cathode coating dispersions according to the invention the ratio of conductive material to binder is suitably between 4:1 and 1:2, preferably between 3:1 and 1:1.

The dispersion in addition advantageously contains a surfactant or a mixture of different surfactants. Suitably commercial representative products from the series of nonionogenic surfactants or fluorosurfactants are used as the surfactants. These surfactants have the task of making the graphite and/or carbon black wettable, of making possible the production of a homogeneous dispersion and of avoiding inclusion of air in the dispersion and ultimately in the protective film.

It is possibly advantageous to use mixtures of two or more surfactants to achieve such objects in an optimal way.

The amount of surfactant or surfactants used suitably amounts to 0.5 to 5 percent by weight, relative to the dry mass of the dispersion. Greater amounts of surfactants are not advisable since otherwise the adhesion of the protective film to the surface to be treated is reduced.

Other additives, such as, antifoaming agents, may be necessary in the formulations.

The dispersion according to the invention is produced so that the conductive component together with the surfactant or surfactants and optionally other additives are mixed with water to form a predispersion. Advantageously the procedure in this case is such that first the surfactant or surfactant mixture optionally with other additives is placed in water and, after that, the conductive material is added. Then the binder, usually prepared as about 50 percent aqueous disperison, is added to this predispersion, and by intensive mixing is further processed to form the ready-to-use homogeneous dispersion.

The cathode coating dispersion according to the invention advantageously exhibits a pseudoplasticity and a thixotropic behavior. Its viscosity is suitably in a range of 0.05 to 1.2 Pa.s (20° C.), advantageously from 0.06 to 1 Pa.s (20° C).

Application of the dispersion can take place in a way known in the art, for example, by immersion, pouring, painting or spraying.

The water can be removed by allowing it to dry, optionally supported by warming or by application of vacuum.

The amount to be applied is advantageously selected so that the film thickness of the protective film after evaporation of the water is suitably 5 to 200 microns and preferably 20 to 100 microns. Thus, a film is formed which is uniform both in itself and in film thickness.

The cathode coating dispersion according to the invention is suitable for treatment of cathode surfaces of primary and secondary batteries. A preferred field of use is the treatment of the inside surface of battery cans. Especially alkali dry cells are produced so that a steel can is preformed and is nickel-plated at least on its inside. Molded rings made from the cathode material, containing a mixture known in the art of manganese dioxide, graphite and potassium hydroxide, fitting tightly on the inside can surface, are introduced into this can. To improve the electrical contact between the can and the rings from cathode material and especially to prevent a corrosion both on the nickel layer and of the can itself, the can is treated on the inside with the dispersion according to the invention. A uniform layer thickness is attained by using the thixotropic and pseudoplastic properties of the dispersion. After removal of the water, a mechanically and chemically resistant, electrolyteinsoluble protective film remains. By the high content of pure and highly crystalline graphite, of the above-mentioned type, moreover an optimal conductivity is guaranteed.

EXAMPLE 1

19.6 g of graphite (99.6 percent C, less than 6 microns) KS 6 LONZA,
0.7 g of surfactant (alkylacryl polyglycol ether) and
0.05 g of wetting agent (fluorinated alkyl carboxylates)
were mixed with
64.5 g of water to form a predispersion, and then processed with
19.9 g of a binder in the form of a 50 percent aqueous vinyl acetate-vinyl chloride-ethylene copolymer dispersion to form the ready-to-use dispersion.

The dispersion was manually applied in a layer thickness of about 60 microns to nickel-plated sheets. After a drying time of 5 hours at room temperature and 0.5 hour at 110° C., the scratch hardness according to ISO 1518 for assessing the adhesion was determined. A value of about 2N was found, which corresponds to an average adhesion.

In a further test, steel cans, nickel-plated on the inside, were coated with the dispersion and dried for 5 hours at room temperature and 0.5 hour at 110° C. Then cathode rings, consisting of manganese (IV) oxide/graphite and potassium hydroxide solution, were introduced. The samples were stored for four weeks in closed containers. For comparison, steel sheets, nickel-plated on the inside, were treated in the same way without protective dispersion. After four weeks of storage, it was possible by the discoloration of the nickel layer definitely to establish that the uncoated can corroded, but the coated did not.

EXAMPLE 2

280 g of graphite KS 6 LONZA,
7 g of surfactant (aromatic polyglycol ether), and
0.5 g of antifoaming agent (fatty acid ester, hydrocarbon mixture)
were mixed with
397.4 g of water to form a predispersion, and then processed with
240 g of a binder in the form of a 50 percent aqueous vinyl chloride-ethylene-vinyl acetate copolymer dispersion to form the ready-to-use dispersion.

The viscosity of the dispersion was 0.075 Pa.s, and the adhesion of a 60-mircon layer on a nickel-plated sheet was 10N (according to ISO 1518).

Further, the change of the contact resistance cathode-nickel-plated can or nickel-plated sheet during storage at increased temperature was determined.

The following table shows the resistance increase of the boundary layer of the cathode (manganese (IV) oxide/graphite/potassium hydroxide)/nickel-plated steel can during storage at 60° C., provided in one case with a contact layer according to this example of 60 microns and in another case without a contact layer:

|  | Resistance (ohm) | | | |
| --- | --- | --- | --- | --- |
|  | Day 0 | Day 5 | Day 10 | |
| with contact layer | 0.01 | 0.05 | 0.1 | (invention) |
| without contact layer | 0.05 | 0.3 | 2.4 | (comparison) |

After the test piece was taken apart, the contact dispersion showed the same good adhesion as immediately after the coating and mixing of the samples.

EXAMPLE 3

In the same process as described in Example 1,
180 g of graphite KS 6 LONZA,
20 g of acetylene black,
5 g of surfactant,
3 g of antifoaming agent,
675 g of water and
240 g of an aqueous 50 percent carboxylated styrene-butadiene copolymer dispersion (about 70 percent styrene) were processed to form a dispersion. Acrylic acid was used to carboxylate the styrene-butadiene copolymer.

The viscosity of the dispersion was 0.96 Pa.s, and the adhesion of a 60-micron layer to a nickel-plated sheet was 6 N (according to ISO 1518).

The study of the contact resistance, as described in Example 2, provided the following values:

|  | Resistance (ohm) | | | |
| --- | --- | --- | --- | --- |
|  | Day 0 | Day 5 | Day 10 | |
| with contact layer | 0.01 | 0.15 | 0.3 | (invention) |
| without contact layer | 0.05 | 0.3 | 2.4 | (comparison) |

What is claimed is:

1. Cathode coating dispersion containing graphite, carbon black or a mixture thereof, for the production of a battery with improved storage and discharge properties, which forms an electrically conductive protective film on the cathode holder, characterized in that the protective film is applied as a homogeneous aqueous dispersion and contains a binder which is a copolymer of (a) vinyl acetate and ethylene, (b) vinyl acetate and vinyl chloride, (c) styrene and butadiene or (d) vinyl acetate, vinyl chloride and ethylene, the ratio of the graphite, carbon black or mixture thereof to the binder being between 4:1 and 1:2.

2. Cathode coating dispersion according to claim 1 wherein the dispersion has a water content between 40 and 95 percent by weight.

3. Cathode coating dispersion according to claims 1 or 2 wherein the ratio of graphite, carbon black or mixture thereof to binder is between 3:1 and 1:1.

4. Cathode coating dispersion according to claim 3 wherein the graphite, carbon black or mixture thereof content of the dry mass is between 40 and 85 percent.

5. Cathode coating dispersion according to claim 4 wherein the dispersion additionally contains a surfactant or several surfactants in an amount of 0.5 to 5 percent by weight of the dry mass of the dispersion.

6. Cathode coating dispersion according claim 5 wherein the dispersion shows a pseudoplastic and thixotropic behavior.

7. Cathode coating dispersion according claim 6 wherein the dispersion has a viscosity of 0.05 to 1.2 Pa.s measured at 20° C.

8. Cathode coating dispersion according to claim 1 wherein the copolymer of styrene and butadiene is carboxylated by incorporation of an unsaturated carboxylic.

9. Cathode coating dispersion according to claim 8 wherein a carboxylated styrene-butadiene copolymer with a styrene portion of more than 50 percent is used.

10. Cathode coating dispersion according to claim 8 wherein the unsatured carboxylic acid is acrylic acid.

11. Cathode coating dispersion according to claim 1 wherein the graphite or carbon black content of the dry mass is between 40 and 85 percent.

12. Cathode coating dispersion according to claim 1 wherein the dispersion additionally contains at least one surfactant in an amount of 0.5 to 5 percent by weight of the dry mass of the dispersion.

13. Cathode coating dispersion according to claim 1 wherein the dispersion shows a pseudoplastic and thixotropic behavior.

14. Cathode coating dispersion according to claim 1 wherein the dispersion has a viscosity of 0.05 to 1.2 Pa.s measured at 20° C.

15. A battery containing an electrically conductive protective film which is 5 to 200 microns thick, deposited from the cathode coating dispersion of claim 1.

16. A battery, wherein the cathode surfaces of the battery contain an electrically conductive protective film, which is 5 to 200 microns thick, deposited from the cathode coating dispersion of claim 1.

* * * * *